(12) United States Patent
Lorre et al.

(10) Patent No.: US 11,976,605 B2
(45) Date of Patent: May 7, 2024

(54) OPTIMIZATION OF A METHOD FOR CONTROLLING AN INTERNAL COMBUSTION ENGINE

(71) Applicant: VITESCO TECHNOLOGIES GMBH, Regensburg (DE)

(72) Inventors: Jonathan Lorre, Toulouse (FR); Stéphane Eloy, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 0 days.

(21) Appl. No.: 18/264,403

(22) PCT Filed: Mar. 4, 2022

(86) PCT No.: PCT/EP2022/055550
§ 371 (c)(1),
(2) Date: Aug. 4, 2023

(87) PCT Pub. No.: WO2022/189291
PCT Pub. Date: Sep. 15, 2022

(65) Prior Publication Data
US 2024/0093657 A1 Mar. 21, 2024

(30) Foreign Application Priority Data
Mar. 12, 2021 (FR) .................................. FR2102474

(51) Int. Cl.
*F02D 41/26* (2006.01)
*F02D 41/06* (2006.01)

(52) U.S. Cl.
CPC .......... *F02D 41/26* (2013.01); *F02D 41/062* (2013.01); *F02D 2250/12* (2013.01)

(58) Field of Classification Search
CPC ..... F02D 41/26; F02D 41/062; F02D 2250/12
See application file for complete search history.

(56) References Cited

U.S. PATENT DOCUMENTS 4,229,793 A * 10/1980 Yoshida .................. F02D 41/26
123/594
4,582,035 A * 4/1986 Kishi .................... F02D 41/345
123/490

(Continued)

FOREIGN PATENT DOCUMENTS

DE 102015215038 A1 2/2017
EP 1589210 A2 10/2005

OTHER PUBLICATIONS

International Search Report w/English translation and Written Opinion of the ISA for PCT/EP2022/055550 dated Jun. 17, 2022, 18 pages.

*Primary Examiner* — Carl C Staubach
(74) *Attorney, Agent, or Firm* — NIXON & VANDERHYE

(57) ABSTRACT

A method for managing an engine for which segment tasks are initiated at a moment referred to as "segment", in order to determine setpoint values which must be available before a predetermined angular time, having the following steps: a) executing a segment task; b) determining the difference between the angular starting time for application of the setpoints and the position corresponding to the availability of the setpoint values; c) comparing the difference determined in step b) with a lower difference value and a greater difference value; and d) modifying the segment if the difference determined in step b) is not between the lower and greater difference values, the position of the segment being advanced if the difference determined in b) is less than the lower difference value and the position of the segment being delayed if the difference determined in b) is greater than the greater difference value.

20 Claims, 2 Drawing Sheets

(56) References Cited

U.S. PATENT DOCUMENTS

| | | | | |
|---|---|---|---|---|
| 5,022,374 | A * | 6/1991 | Denz | F02D 41/062 123/490 |
| 8,660,776 | B2 | 2/2014 | Mueller et al. | |
| 9,845,762 | B2 * | 12/2017 | Pelizzoni | F02D 41/009 |
| 2008/0060617 | A1 * | 3/2008 | Adachi | F02D 41/009 123/456 |
| 2008/0228376 | A1 * | 9/2008 | Usukura | F02D 41/062 701/113 |
| 2009/0049895 | A1 * | 2/2009 | Huber | G01M 15/11 73/114.02 |
| 2010/0179744 | A1 * | 7/2010 | Baranowski | F02D 41/2416 701/103 |
| 2015/0088403 | A1 * | 3/2015 | Pelizzoni | F02D 41/009 701/104 |
| 2016/0363066 | A1 * | 12/2016 | Sanborn | F02D 41/3094 |
| 2016/0363089 | A1 * | 12/2016 | Hollar | F02D 41/3094 |

\* cited by examiner

OPTIMIZATION OF A METHOD FOR CONTROLLING AN INTERNAL COMBUSTION ENGINE

CROSS-REFERENCE TO RELATED APPLICATIONS

This application is the US national stage of PCT/EP2022/055550, filed Mar. 4, 2022, and designating the United States, which claims the priority of FR FR2102474, filed Mar. 12, 2021. The entire contents of each foregoing application are incorporated herein by reference.

The present invention relates to a method of controlling an internal combustion engine.

Technical field

The present disclosure concerns the field of the management of internal combustion heat engines, notably engines for motor vehicles.

Prior art

In an internal combustion engine, the management of the engine, and notably of the combustion, is assisted by an electronic calculator.

In an engine referred to as four-stroke engine, which has one or more cylinders, a full combustion cycle is carried out in two engine revolutions, that is to say where a crankshaft rotated by a piston/connecting rod assembly performs two revolutions, that is to say a rotation through 720° (or 720° CRK), per cylinder. A similar process is reproduced every 720° CRK. For each cylinder, before each combustion, a calculator determines setpoint values linked to the combustion which will occur, such as opening start and finish times for a needle of a fuel injector, possibly control times for the ignition coils, and in certain cases also other setpoint values relating, for example, to the gasoline pump or other accessories of the engine.

To ensure proper combustion and thus limit the expulsion of pollutants by the engine, the combustion setpoint values are calculated as late as possible to benefit from the latest data concerning the state of the engine (said data being obtained by sensors or else by software) whilst still allowing the calculator determining the combustion setpoint values for the one part enough time to carry out its calculations and for the other part enough time to be able to apply the setpoints which will have been determined. Thus, the results of the calculation should preferably be available approximately 80° CRK before transition to top dead center in the corresponding cylinder in compression.

To control an engine, certain tasks are performed on the basis of the position of the engine, that is to say that once a predetermined engine position has been reached, the corresponding task is triggered. Later on, "segment" will be used to refer to such a predefined moment during a cycle (of 720° CRK) which corresponds to the starting point of a task, because of this referred to as "segment task", that is to be accomplished by the calculator in order to determine the combustion setpoint values and possibly other operational setpoint values of the engine. A segment task generally corresponds to a task which is important for the proper operation of the engine, such as preparation for a combustion, which is performed at the transition substantially to each top dead center at the end of compression in a cylinder. A segment task then consists notably in collecting the main parameters of the engine (temperature of the fuel, pressure of the fuel and of the air, rotational speed, oil and water temperature, etc.) and, on the basis of these values, determining (by calculation and/or as a function of tables stored in memory) setpoint values notably for the injection of fuel and/or ignition.

Similarly, at the angular halfway point of two neighboring segments, a "half-segment" event is defined which corresponds to a starting point for tasks then referred to as "half-segment tasks", which are generally less-critical tasks than the segment tasks.

For an internal combustion engine, the process for managing the engine generally provides having one segment per cylinder and per engine cycle, that is to say that, during a cycle of 720° CRK, there are as many segments as there are cylinders. A segment is determined for each cylinder such that the calculator can determine new combustion setpoint values and has enough time to apply them to the forthcoming combustion. This segment is determined depending on the angular position of the engine. For an engine with four cylinders, there will therefore be four segments per cycle of 720° CRK, and thus one segment every 180° CRK. The half-segments are also spaced apart from one another by 180° CRK by being phase-shifted by 90° CRK in relation to the segments. Consequently, when the rotational speed of the engine is relatively slow, the calculator terminates its segment task long before the engine reaches the position at which the data must be present, so that the corresponding combustion is initiated with the calculated setpoint values. Conversely, at high speed, there might not be enough time for the calculator to finish its segment task early enough to implement the calculated setpoint values. In such a case, it is then provided, for the one part, to carry out combustion with the setpoint values that were calculated during the same segment task of the previous cycle and, for the other part, to move the contents of the task to the previous half-segment. In the case of a four-cylinder engine, the start of the task is therefore generally offset by 90° CRK (i.e. 180° CRK/2 or, more generally, 720° CRK/n/2, where n is the number of cylinders of the engine.

This strategy works but poses several problems.

First of all, when it has not been possible to calculate the combustion setpoint values on time, those that are then used are "former" setpoint values and are therefore not strictly optimal. There is thus a slight degradation of the combustion in certain cases.

Then, if the segment is offset, it may be the case that the information taken into account for establishing the combustion setpoint values are not the most optimal ones that could potentially be used to this end.

Lastly, it is necessary for software to manage the changeover between the transition from the "normal" segment to the "advanced" segment. It is notably necessary to check that this transfer, which also interacts with the management of the half-segment tasks, has been managed correctly.

Summary

The present disclosure will improve the situation. It notably has the aim of optimizing the determination of the combustion setpoint values, notably when the engine speed increases and when, as a result, the time between two segments decreases.

Advantageously, it will be ensured that the setpoint values are available on time.

Advantageously, the setpoint values will be calculated with the latest information that can be accessible for the forthcoming combustion.

Preferably, the changeovers caused by a segment modification will be simplified.

What is proposed to that end is a method for managing an internal combustion engine operating in a predetermined cycle during which cyclical tasks, referred to as segment tasks, are triggered so as to be initiated by a calculator at a predefined moment of the cycle, which moment is referred to as "segment", in order to determine setpoint values for a forthcoming action, said setpoint values needing to be available before a predetermined angular starting time for application of said setpoints corresponding, for example, to a given angular position of a crankshaft of the engine.

What is proposed here is that said method has the following steps:
a) executing a segment task,
b) determining the difference between the angular starting time for application of the setpoints and the position corresponding to the availability of the setpoint values,
c) comparing the difference determined in step b) with, on the one hand, a lower difference value and, on the other hand, a greater difference value, the greater difference value being greater than the lower difference value,
d) modifying the position of the segment for a segment task to be subsequently performed if the difference determined in step b) does not lie between the lower difference value and the greater difference value, the position of the segment being advanced if the difference determined in step b) is less than the lower difference value and said position of the segment being delayed if the difference determined in step b) is greater than the greater difference value.

In a novel manner, what is proposed here is to regulate the performance of the segment tasks at the ends of tasks rather than at the starts of tasks for the solutions of the prior art. This makes it possible to control the moment of completion of each of the tasks having regard to the events following said tasks.

The features set out in the following paragraphs can optionally be implemented independently or in combination:
a predefined initial segment position is used to start up the engine, it being possible for this initial position to be for example 80° CRK before a piston reaches top dead center in a cylinder in compression;
a segment is advanced in step d) such that the difference in step b) calculated with the advanced segment is closer to the greater difference value than to the lower difference value;
a segment is delayed in step d) such that the difference in step b) calculated with the delayed segment is closer to the lower difference value than to the greater difference value;
the segment task calculates injection setpoints for a forthcoming combustion; in this case, it is then possible, for example, to provide that the angular starting time for application of the setpoints corresponds to the start of activation of commanding the injector.

According to another aspect, what is proposed is a system for managing an internal combustion engine, characterized in that it has means for implementing each of the steps of a method described above.

According to another aspect, what is proposed is an internal combustion engine, characterized in that it has a management system according to the previous paragraph.

According to another aspect, what is proposed is a vehicle, characterized in that it has an internal combustion engine according to the previous paragraph.

According to another aspect, what is proposed is a nonvolatile storage medium which can be read by a computer and on which is stored a computer program comprising program code instructions for executing the steps of a method as defined herein.

According to another aspect, what is proposed is a computer program having program code instructions which are stored on a medium which is readable by a computer for implementing all or some of a method as defined herein when this program is executed by a computer.

BRIEF DESCRIPTION OF THE DRAWINGS

Other features, details and advantages will emerge upon reading the following detailed description and from examining the appended drawings, in which.

DESCRIPTION OF THE EMBODIMENTS

Figure 1:
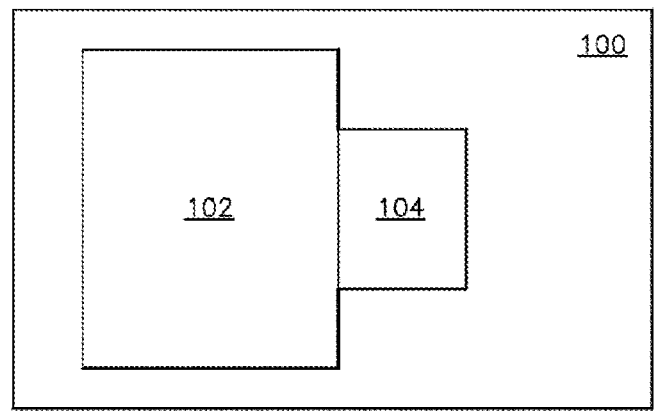
FIG. 1 schematically shows a vehicle.

Reference is now made to FIG. 1. This figure schematically shows a vehicle 100 equipped with an internal combustion engine 102. A command and management system 104 for the heat engine is provided.

The heat engine 102 is an engine referred to as four-stroke engine. It has cylinders in which a piston moves each time in a back-and-forth movement, and this movement is converted into a rotational movement of a crankshaft via connecting rods. To carry out a full combustion cycle in a cylinder, the crankshaft makes two revolutions, i.e. 720° or 720° CRK. Those skilled in the art are aware of the operation of such an engine.

The command and management system needs to be aware of the position of each piston in the cylinders. It is then known to provide the crankshaft with a target having peripheral teeth. All the teeth are similar and distributed uniformly around the periphery of the target. A position sensor is placed facing the target and detects the passage of each tooth of the target. The sensor detects each passage of an active edge of a tooth, that is to say either the rising edge or the falling edge. To find a position on the target, a hole is made in the periphery of the target by removing at least one tooth, generally two teeth.

The engine has various sensors, such as a crankshaft position sensor, for knowing the position of certain movable elements of the engine or, for example, to have information such as (water, oil, air) temperatures. On the basis notably of this information, the command and management system 104 can determine, for each combustion within the engine, setpoint values for the injection of fuel into the cylinders (for example amount and flow rate of the injection) and, depending on the type of engine, setpoint values for the ignition. Other setpoint values known to those skilled in the art should also be calculated, but will not be mentioned in the present description to as not to overload it. The method described here can also be applied to the calculation of these other setpoint values.

For each combustion, an important reference is the position of the engine when the corresponding piston is at top dead center at the end of a compression phase. Fuel is generally injected into the corresponding cylinder before the piston has reached top dead center. The injection starts, for example, 50° CRK before top dead center at the end of compression for the cylinder in question. It is then necessary for the setpoint values for the injection to be calculated at the start of injection. It is then provided, for example, to commence calculation of these setpoint values to be counted from 80° CRK before top dead center at the end of compression in question. The values given here are illustrative and nonlimiting.

The position of the engine (expressed in ° CRK modulo 720° CRK) at which the calculation of setpoint values for the injection of fuel commences for a cylinder is referred to as a "segment". For an engine cycle (over two revolutions of the crankshaft, i.e. 720° CRK), there are as many segments as there are cylinders in the engine. Upon each segment, the command and management system, or more particularly a calculator (or ECU for Engine Control Unit) is called on to determine the injection setpoint values (and possibly also other values). There is thus, for example, one segment every 180° CRK for an engine having four cylinders in line.

A task executed by the command and management system 104 starting at a segment is referred to as "segment task".

Figure 2:
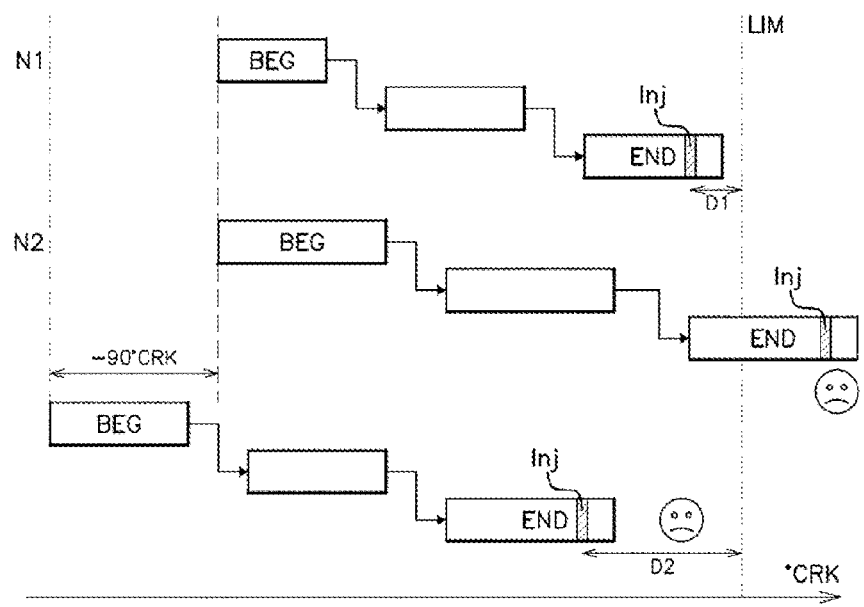
FIG. 2 is an illustrative diagram of a method of the prior art.

FIG. 2 illustrates three segment tasks, one below another. The abscissa axis in this figure corresponds to the angular position of the engine, expressed here in ° CRK. Each segment task is illustrated here, purely illustratively and nonlimitingly, by three steps: an initial first step (BEG), an intermediate step and a final step (END). During this final step, the setpoint values for the injection are determined during a sub-step referred to as "Inj".

In FIG. 2, a vertical solid line illustrates the limit LIM before which the setpoint values for the injection must be calculated. This limit LIM (expressed in ° CRK) can correspond to the start of application of the setpoints calculated previously, for example the start of control of the fuel injector.

For the first segment task in FIG. 2, the segment task starts at the level of a segment illustrated by a dashed vertical line. This segment task is performed at an intermediate engine speed N1. It will be noted that the setpoint values for the injection are determined before the start of the injection phase. Here, D1 denotes the difference between the predetermined limit LIM for supplying these setpoint values. Therefore:

$$D1=LIM-Inj$$

where LIM and Inj are each expressed in ° CRK.

It will be noted that, for the first segment task, the sub-step Inj which makes it possible to determine the setpoint values for the injection is finished long before the predetermined limit LIM.

When the engine speed increases and changes from N1 to N2>N1, the segment task takes substantially the same amount of time in seconds (or more specifically milliseconds) and then extends over a wider angular range (in ° CRK). When the engine speed increases, a moment then comes at which the determination of the setpoint values for the injection (sub-step Inj) is not terminated before the predetermined angular limit LIM. This is illustrated by the second segment task in FIG. 2.

Conventionally, in a procedure of the prior art, it is then provided for the combustion in question, for the one part, to return to previously calculated setpoints as setpoint values for the forthcoming injection and, for the other part, to offset the segment as illustrated in FIG. 2 with the third segment task. The offset which is performed is an offset corresponding to a half-segment, i.e. 90° CRK for a four-cylinder engine. As a result, the segment tasks are offset and are triggered upon subsequent half-segments.

By offsetting the segment by 90° CRK (or more generally by a half-segment), setpoint values for the injection are then determined on time and D2 refers to the (angular) difference between the position for determining the injection setpoint values and the predetermined limit LIM. This offset then certainly makes it possible to have, upon each combustion, new setpoint values but with one segment offset by a half-segment, and the information available at the start of the segment task is not necessarily the most appropriate information for the calculation of the setpoint values of the forthcoming combustion. For example, the measurements of pressure and instantaneous speeds differ from what would have been measured without offsetting the segment. In addition, each new offset must be analyzed by the various users of the segment, such as the injection, to check that there is no hidden impact.

Figure 3:
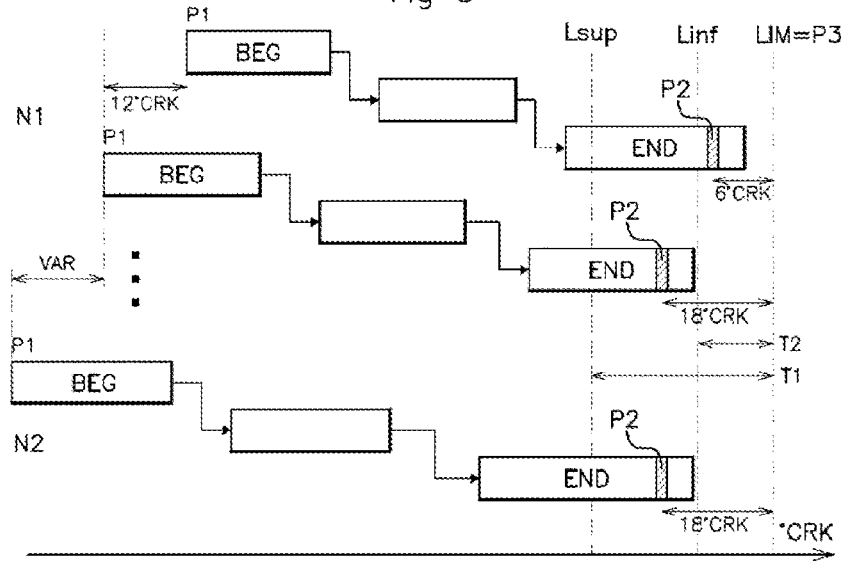
FIG. 3 is an illustrative diagram of a method according to the present disclosure.

FIG. 3 illustrates a proposed procedure to follow according to the present disclosure.

FIG. 3 gives consideration to the same internal combustion engine as that taken as an example for FIG. 2. It illustrates segment tasks in various scenarios. In this figure, like for FIG. 2, there is an abscissa axis indicating, in ° CRK, the angular position of the engine, a vertical dashed line indicating one segment and a vertical solid line illustrating the limit position LIM of the engine before top dead center is reached at the end of compression, before which the setpoint values for the forthcoming combustion must be available.

Compared to FIG. 2, a vertical line corresponding to a lower limit Linf and a vertical line corresponding to an upper limit Lsup will be noted. The limits in question here are the distances (in ° CRK) separating the position of availability of the setpoint values for the forthcoming combustion and the predetermined limit position LIM.

What is proposed is for the sub-step Inj of FIG. 2 (reference P2 in FIG. 3), that is to say the sub-step at the end of which the setpoint values for the forthcoming combustion are available, to be between the lower limit Linf and the upper limit Lsup as often as possible.

Purely illustratively and nonlimitingly, Linf could be chosen for example such that LIM-Linf=10° CRK and Lsup such that LIM-Lsup=20° CRK.

The first segment task illustrated in FIG. 3 is carried out at a speed N1. It is assumed, for example, that the engine has undergone an acceleration phase to reach the speed N1. The first segment task of FIG. 3 is carried out at this engine speed N1. Upon completion of this segment task, the calculated setpoint values are made accessible at the position P2 which, in the illustrative and nonlimiting example, is between Linf and LIM; for example here, as indicated, P2 is available 6° CRK before the predetermined limit LIM, which here can also correspond to the start of commanding the injector that is to inject fuel.

The setpoint values are available far enough in advance in this instance. However, if the engine speed needs to increase, it will be noted that there is a quite significant risk of these setpoint values no longer being rapidly accessible before the predetermined limit LIM. What is therefore proposed here is to act and modify the segment. What is proposed here (second segment task illustrated in FIG. 3) is to advance the segment by 12° CRK for the forthcoming combustions. It is assumed here that the segment task is executed substantially from one time to another over one and the same angular range, for example 30° CRK. It is proposed to modify the segment, that is to say the starting point of the segment task during which the setpoint values for the forthcoming combustion are calculated, such that, in substantially similar conditions (same speed and same execution duration of the segment task), the setpoint values are available at an angular position between Lsup and Linf, but preferably closer to Lsup than Linf. What is proposed here is to move the position P2, from which the setpoint values are available, away from the limit (here Linf) which has been crossed.

As a result, in the purely illustrative and nonlimiting numerical example set out here, P2 for the first segment task of FIG. 3 at the speed N1 was in advance of the predetermined limit LIM by 6° CRK. As Linf is 10° CRK away from LIM, P2 was at a delay of 4° CRK in relation to the limit Linf.

It will be understood here that a first event is in advance of a second event when the first event occurs in the time, or on the axis of the angular position of the engine, before the second element. It is then considered in this case that the second event is at a delay in relation to the first event.

By then advancing, as illustrated in FIG. 3, the segment by 12° CRK, the position P2 in similar conditions will then also be advanced by 12° CRK. It is therefore in advance of the predetermined limit LIM by 18° CRK (6+12° CRK). This position P2 is then between the limits Lsup and Linf, at 2° CRK from Lsup and at 8° CRK from Linf.

If the engine speed continues to increase so as to arrive at N2>N1, the position of the segment will continue to vary. It is possible to provide varying the positions of the segment one degree at a time or else by increments of several degrees.

FIG. 3 illustrates the case of an increasing engine speed. Those skilled in the art will understand that, when the engine speed decreases, in most cases (since the execution time of a segment task in milliseconds is substantially constant) the position P2 at which the setpoint values are available for the forthcoming combustion will leave the range [Linf, Lsup] such that LIM-P2 is greater than Lsup. In this case, the segment will be delayed such that the position P2 is between Lsup and Linf, preferably being closer to Linf than Lsup.

Figure 4:
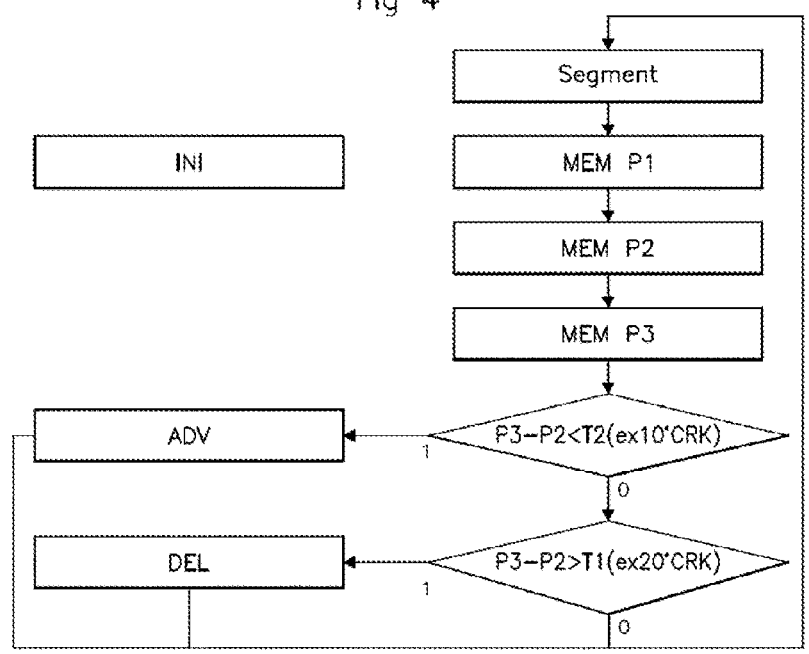
FIG. 4 shows a flow diagram of an internal combustion engine management method corresponding to the illustration of FIG. 3.

FIG. 4 proposes a flow diagram for implementing a method illustrated by a purely illustrative and nonlimiting application example in FIG. 3.

Upon startup of the engine, an initialization phase INI is performed. During this step, a position for a first segment is defined. This position is defined depending on the characteristics of the engine. This first segment is used for the startup of the vehicle. In the following text, the position of the segment used as starting point of a segment task will be referred to as P1.

Once the engine starts to rotate, the flow diagram commences with a step referred to as "segment", in which the command and management system monitors the rotation of the engine and waits until a position corresponding to a segment is reached. Once the position of the segment has been reached, the corresponding segment task is triggered and the position P1 for starting up the segment task is stored in memory. This step is referred to as MEM P1.

The segment task is executed, for example in three steps as mentioned above illustratively but nonlimitingly, and during said segment task, generally shortly before the end of the segment task, the setpoint values for a forthcoming combustion are determined and accessible to the system for commanding and managing the engine. The position of the engine at which these setpoint values are available is referred to P2, as already indicated above. This value is stored in memory. This step is referred to as MEM P2 in the flow diagram.

Most often, the predetermined limit LIM does not change. However, there may be cases in which this limit value can be made to change during operation of the engine when certain specific conditions are encountered. In such a case, the setpoint values calculated during the segment task also give the value of the limit LIM, which is then referred to as P3 here. This value is also stored in memory (step MEM P3).

The two following steps serve to determine if the angular position P2 at which the setpoint values become accessible is in a predefined range. In the flow diagram, the value P3-P2 is then compared to two values corresponding to the endpoints of a range. These two limit values are referred to as T1 and T2 here. As shown in FIG. 3, the value T1 corresponds to the upper limit Lsup defined previously, while the limit value T2 corresponds to the lower limit Linf defined above. The procedure illustrated by the flow diagram of FIG. 4 thus tests if the value (P3-P2) is less than T2 or greater than T1. If it is not (in the flow diagram, the value 1 corresponds to "yes" whereas the value 0 corresponds to "no"), this means that the position P2 is indeed within the predefined limits. In the previous numerical example (FIG. 3), the following will apply: T1=20° CRK and T2=10° CRK.

Conversely, if the position P2 is not within the desired range (between Lsup and Linf, that is to say that the difference P3-P2 is not within the range [T1, T2], it is proposed to modify the segment, that is to say here the value of P1.

If P3-P2 is less than T2, this means that the position P2 comes close to the position P3 (limit LIM). In this case, it is necessary to advance the segment and thus reduce the value of P1.

If P3-P2 is greater than T1, this means that the position P2 is "too far" in advance of the start of the injection (corresponding to the position P3 of the predetermined limit LIM). It is then necessary to delay the segment and thus increase the value of P1.

If P1' is the new value of P1 and Dseg is the duration (in ° CRK) between the position P1, for the one part, and the position of the engine at which the setpoint values are available (P2), for the other part. The constraint on P1' is that P1'+Dseg lies between Lsup and Linf.

The following inequality is thus desired:
Lsup<P1'+Dseg<Linf

The following also applies:
Dseg.P2−P1
Lsup.P3−T1
Linf=P3−T2.

With reference to the inequality above, the following is obtained:
P3−T1<P1'+P2−P1<P3−T2

Namely:
P3−P2−T1<P1'−P1<P3−P2−T2 in which P1'−P1, which can be negative (step ADV in the flow diagram) or positive (case DEL in the flow diagram) corresponds to the offset of the segment.

As indicated above, if P1'−P1<0, that is to say if P3−P2<T2, preference is given to P2 being closer to Lsup than to Linf, that is to say:
(P1'+Dseg)−Lsup<Linf−(P1'+Dseg)
P1'+P2−P1−(P3−T1)<P3−T2−(P1'+P2−P1)
(P1'−P1)+P2−P3+T1<P3−T2−P2−(P1'−P1)

As indicated above, the offset (P1'-P1) may be for example a multiple of WORK, for example a multiple of 6° CRK. In such a case, it is necessary to provide that the margin, that is to say T1-T2, is greater than "n", for example around 2n.

Industrial application

The present technical solution can be applied notably to the management of tasks in an engine command/control method.

The proposed solution is to choose values depending on the performance of the engine such that the segment tasks are always (or almost always) executed within the prescribed time limits.

Moreover, optimizing the segments to the operating conditions of the engine makes it possible to gradually modify the segments and, as a result, it is not necessary to manage the changeover phase or resulting analysis phase. The offset of the segment (in the sense of advancement) is not limited: this enables great flexibility of use of the method proposed here.

The method proposed also functions when the engine is resynchronized after a loss of synchronization. In such a case, taking account of the inertia of the engine, the rotational speed is substantially constant and can only decrease. During the resynchronization, the position of the start of the segment is then advantageously identical to that calculated before the loss of synchronization.

The present disclosure is not limited to the exemplary embodiment described above, solely by way of example, and to the variants mentioned, but it encompasses all the variants that those skilled in the art may consider in the context of the protection sought.

The invention claimed is:

1. A method for managing an internal combustion engine operating in a predetermined cycle during which cyclical tasks, referred to as segment tasks, are triggered so as to be initiated by a calculator at a predefined moment of the cycle, which moment is referred to as "segment", in order to determine setpoint values for a forthcoming action, said setpoint values needing to be available before a predetermined angular starting time for application of said setpoints corresponding, the method comprising:
    a) executing a segment task,
    b) determining the difference between the angular starting time for application of the setpoints and the position corresponding to the availability of the setpoint values,
    c) comparing the difference determined in step b) with both a lower difference value and also a greater difference value, the greater difference value being greater than the lower difference value,
    d) modifying the position of the segment for a segment task to be subsequently performed if the difference determined in step b) does not lie between the lower difference value and the greater difference value, the position of the segment being advanced if the difference determined in step b) is less than the lower difference value and said position of the segment being delayed if the difference determined in step b) is greater than the greater difference value.

2. The method as claimed in claim 1, wherein a predefined initial segment position is used to start up the engine.

3. The method as claimed in claim 1, wherein a segment is advanced in step d) such that the difference in step b) calculated with the advanced segment is closer to the greater difference value than to the lower difference value.

4. The method as claimed in claim 1, wherein a segment is delayed in step d) such that the difference in step b) calculated with the delayed segment is closer to the lower difference value than to the greater difference value.

5. The method as claimed in claim 1, wherein the segment task calculates injection setpoints for a forthcoming combustion.

6. The method as claimed in claim 5, wherein the angular starting time for application of the setpoints corresponds to the start of activation of commanding the fuel injector.

7. A system for managing an internal combustion engine, comprising means for implementing each of the steps of the method as claimed claim 1.

8. An internal combustion engine comprising the management system as claimed in claim 7.

9. A motor vehicle comprising the internal combustion engine as claimed in claim 8.

10. A nonvolatile storage medium which can be read by a computer and on which is stored a computer program comprising program code instructions for executing the steps of the method as claimed in claim 1 when the code instructions are executed by the computer.

11. The method as claimed in claim 2, wherein a segment is advanced in step d) such that the difference in step b) calculated with the advanced segment is closer to the greater difference value than to the lower difference value.

12. The method as claimed in claim 2, wherein a segment is delayed in step d) such that the difference in step b) calculated with the delayed segment is closer to the lower difference value than to the greater difference value.

13. The method as claimed in claim 3, wherein a segment is delayed in step d) such that the difference in step b) calculated with the delayed segment is closer to the lower difference value than to the greater difference value.

14. The method as claimed in claim 2, wherein the segment task calculates injection setpoints for a forthcoming combustion.

15. The method as claimed in claim 3, wherein the segment task calculates injection setpoints for a forthcoming combustion.

16. The method as claimed in claim 4, wherein the segment task calculates injection setpoints for a forthcoming combustion.

17. A system for managing an internal combustion engine, comprising means for implementing each of the steps of the method as claimed in claim 2.

18. A system for managing an internal combustion engine, comprising means for implementing each of the steps of the method as claimed in claim 3.

19. A system for managing an internal combustion engine, comprising means for implementing each of the steps of the method as claimed in claim 4.

20. A system for managing an internal combustion engine, comprising means for implementing each of the steps of the method as claimed in claim 5.

* * * * *